United States Patent

[11] 3,626,100

[72] Inventors Joseph Hood McNeilly
Harlow Essex;
Roger Alan Manship, Stortford, both of England
[21] Appl. No. 826,416
[22] Filed May 21, 1969
[45] Patented Dec. 7, 1971
[73] Assignee International Standard Electric Corporation
New York, N.Y.
[32] Priority June 21, 1968
[33] Great Britain
[31] 29,773/68

[54] SUBSCRIBER SUBSET FOR A PCM-LOOP SYSTEM
7 Claims, 4 Drawing Figs.

[52] U.S. Cl. ........ 179/15 AL
[51] Int. Cl. ........ H04j 3/08
[50] Field of Search ........ 179/15 AL; 340/172.5

[56] References Cited
UNITED STATES PATENTS

| | | | |
|---|---|---|---|
| 3,458,661 | 7/1969 | Forde et al. .......... | 179/15 AL |
| 3,483,329 | 12/1969 | Hunkins et al. .......... | 179/15 AL |
| 3,519,750 | 7/1970 | Beresin et al. .......... | 179/15 AL |

*Primary Examiner*—Kathleen H. Claffy
*Assistant Examiner*—David C. Stewart
*Attorneys*—C. Cornell Remsen, Jr., Walter J. Baum, Percy P. Antzy, J. Warren Whitesel, Delbert P. Warner and James B. Raden

ABSTRACT: A subset for use in a pulse code modulated telephone system is provided which system employs a transmission loop with subscriber subsets serially inserted into said loop at various points along its length. The subset encodes signals within itself through use of gating and shift register circuits. Means are provided to disconnect a subset and keep the loop closed in the event of power failure in a subset.

J. H. McNEILLY
R. A. MANSHIP
Inventors

By D. D. Warner
Attorney

SUBSCRIBER SUBSET FOR A PCM-LOOP SYSTEM

This invention relates to a subscriber subset for a PCM telephone system in which a group of subscribers have access to a common "ring main" loop line arranged for the continuous unidirectional circulation of multiplexed PCM signals.

Subscribers on the loop communicate with one another by seizing a free time slot in the loop by means of a line connecting means which connects the subscriber to the loop at the appropriate times. Signals from a first subscriber destined for a second subscriber are transmitted around the loop as far as the second subscriber and there terminated. While signals from the second subscriber for the first subscriber are transmitted around the remainder of the loop as far as the first subscriber and there terminated. If a subscriber is engaged on a call all other signals are merely regenerated and retimed and passed on to the next subscriber. The system makes use of subscriber equipments which incorporate individual pulse modulating and demodulating means, i.e., each subset includes a PCM coder and decoder. The advent of integrated solid-state circuits enables such coder/decoders to be built into conventional sized telephone sets alongside other digital equipments such as synchronizing, dialling and other circuits which can also be constructed in integrated circuits.

According to the present invention a subscriber subset for a PCM telephone system of the type set forth has a line connecting means which includes a shift register, means for recording in the shift register all the incoming line signals, means for replacing line signals in the shift register with signals generated in the subset whenever such signals are generated, means for transferring the contents of the shift register to the outgoing line whenever the subset is locked onto a channel in the loop and means for interrupting the line between the input to and the output from the shift register when the subset locked to the channel.

As the line signals are retimed and regenerated at each subset a failure at one subset could make the whole system inoperative. Failures of this nature are due either to (*a*) failure of an integrated circuit or some discrete components in the subset, or to (*b*) failure of a power supply. Where each subset is separately powered the failure of the power supply at source, the possibility of the power supply being disconnected or the short circuiting of a component which effects the power supply, must be considered.

Correct design and choice of components help to eliminate or reduce failure due to (*a*) above.

To combat failures of a power supply as outlined at (*b*) above a subscriber subset for a PCM telephone system of the type set forth includes a relay inserted in the loop the contacts of which are set to bypass the subscriber subset when the relay power supply fails, the operating coil of the relay being connected across the power supply in the subset, the voltage necessary for holding the relay being within the voltage range required for normal operation of the subset.

Thus if the supply fails the voltage will be insufficient to hold in the relay and it will bypass the subset so that the loop will not be completely interrupted.

The above-mentioned and other features of the invention and the manner of attaining them will become more apparent and the invention itself will be best understood by reference to the following description taken in conjunction with the accompanying drawings, wherein.

Figure 1:
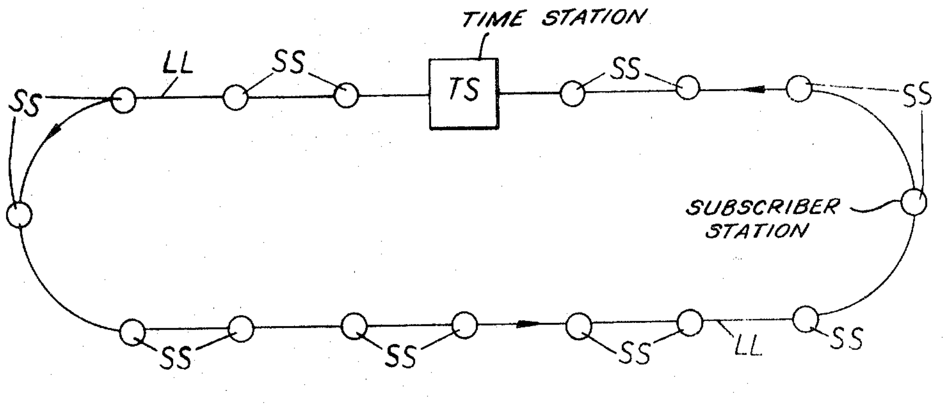
FIG. 1 is a diagrammatic illustration of the layout of a PCM telephone system of the type set forth above.

The basic network is shown in FIG. 1 and consists of a number of subscribers SS connected to one another by a closed loop unidirectional transmission line LL. The loop includes a timing station TS the function of which is to provide a number of time multiplexed channels in the loop. Each subscriber SS has access to any unused channel for the purpose of making a connection and each subscriber is responsive to his unique identification signal appearing on any channel to cause a connection to be completed. Once a channel has been seized for a particular connection it is retained by that connection until the connection is terminated and it is not available for any other subscribers.

Figure 2:
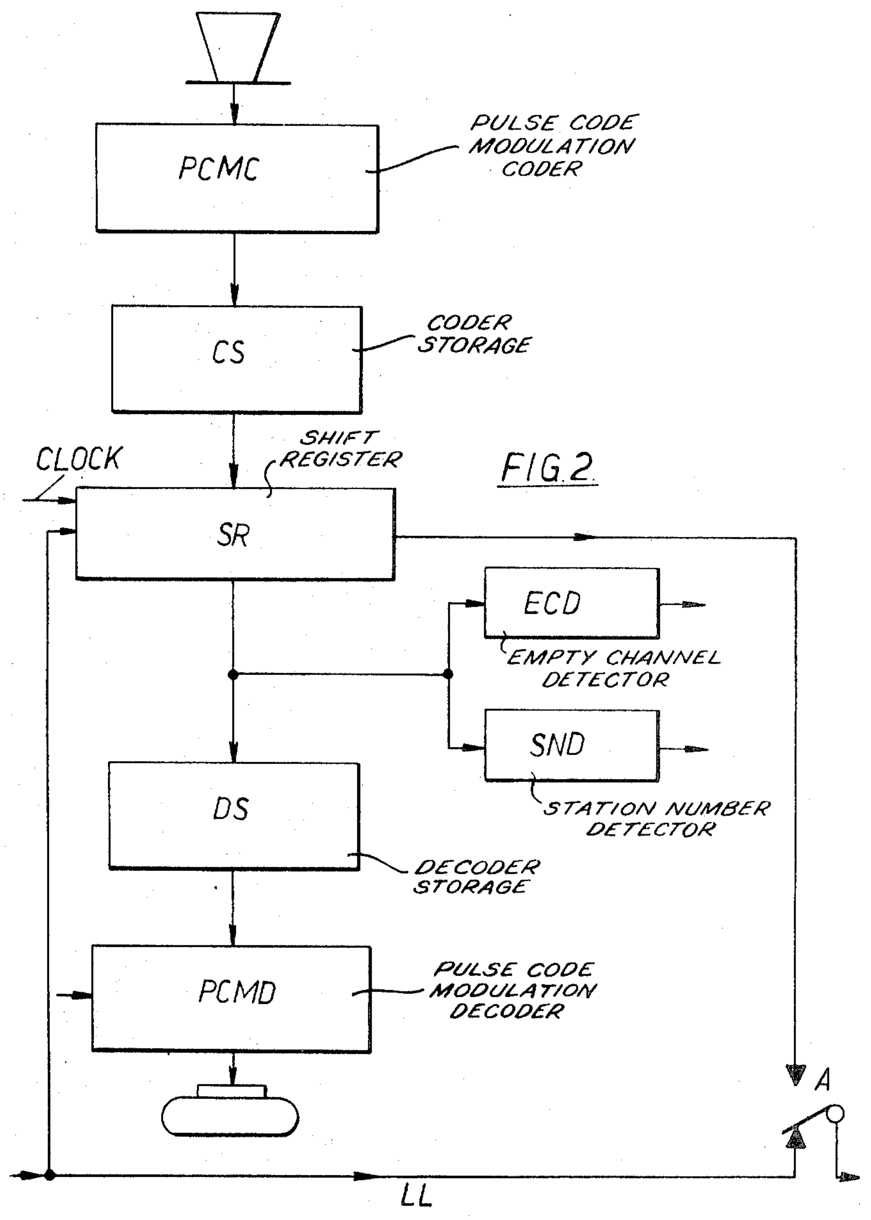
FIG. 2 is a block diagram of part of a subscriber subset.

FIG. 2 shows that portion of a subscriber subset concerned with the reception and transmission of signals over a looped line LL. It does not show the synchronizing circuits or those responsible for generating the ringing tone, engaged tone etc. Such circuits are provided by straightforward logic modules and have been described in a general manner in our copending British Pat. application No. 48466/67 (D. L. Thomas 19). The subset consists essentially of a normal-size telephone set which has built into it integrated solid state circuits performing the necessary switching and other functions. Thus the microphone and earpiece are provided with a pulse code modulation coder PCMC and decoder PCMD respectively. The coder and decoder each have a store CS and DS respectively and all signals are received from or transmitted to the line via a shift register SR.

The input to the shift register SR is permanently connected to the line LL so that all the line signals are entered into SR, which is driven by a clock pulse train generated by the synchronizing circuits (not shown). In the standby condition line gate A completes the looped line and so all the line signals, as well as entering SR, are passed on round the loop. In the standby condition the subset must examine the line signals to determine either the presence in a channel of its own number or the existence of an empty channel if a call is initiated at this subset. Therefore the signals appearing in each channel are sensed in the shift register SR and a record is transmitted to an empty channel detector ECD and a station number detector SND. They are also put into the decoder store DS but in the standby condition PCMD is inoperative, as also is PCMC. While a call is in progress synchronizing circuits are locked onto one particular channel, i.e., connected to process signals in one channel, and the following operations take place:

1. The clock drive to SR is inhibited.
2. Coded PCM is fed from CS to SR in parallel.
3. When the appropriate channel occurs the line gate A is switched to the output of SR and the clock drive is energized for the duration of that channel only. The information from CS is thus inserted in the channel and at the same time line incoming signals in that channel are read into SR.
4. After the channel has gone the incoming signals now in SR are transferred in parallel to the decoder store DS and thence to the decoder PCMD.

Figure 3:
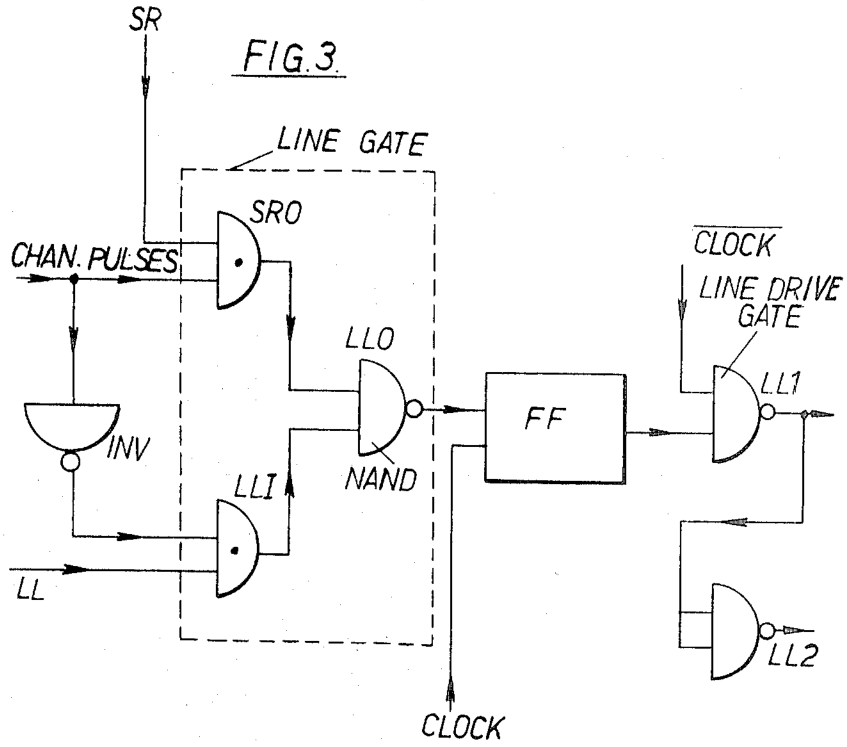
FIG. 3 illustrates the gating arrangements of FIG. 2 in greater detail.

Thus only one line gate is actually required and this gate A controls which information is taken from the loop and replaced by fresh information. To ensure that the new signals are in exactly the correct sequence with the rest of the line signals all the signals leaving gate A are retimed or synchronized in a shift register or flip-flop (FIG. 3). PCMD is also driven by the tone generators to make the ringing tones etc.

The gating arrangement is shown in greater detail in FIG. 3. The line gate is shown within the dotted line. The AND gates SRO and LL1 are operated in antiphase by the channel pulses and the inverted channel pulses via INV, allowing either the SR output or the line signals to be fed to the NAND-gate LLO, which is the equivalent of a 2-way switch. The output of LLO is fed to a flip-flop FF driven by the local subset synchronizing clock and all the signals going out to the line are therefore retimed. As the FF output is a 100 percent duty cycle it is gated with the inverse clock in the line drive gates LL1 and LL2 to restore the 50 percent duty cycle for a balanced line. The retiming arrangement introduces a delay equal to half a clock pulse period but this does not affect the operation of the complete system since a master timing station is used in any case to control the overall timing of the signals in the loop, primarily to overcome propagation delays around the loop.

From the foregoing, it is clear that when a subscriber makes a call he lifts his handset and dials the number wanted. His subset seizes a previously empty channel and inserts the number into the seized channel. The called subset recognizes the number if it is free and locks onto the same channel. When the two subscribers are talking, PCM signals from the first subscriber travel round part of the loop to the second subscriber where they are extracted and decoded. Signals from the second subscriber are inserted in the same channel and travel round the remaining part of the loop to the first subscriber in the same way. Thus the signals bypass all unwanted intermediate subsets.

It is convenient to design the system so that all the line signals are regenerated and retimed at each subset. This ensures the highest quality line transmission at all times. However if a subset power supply fails the loop will be broken at the point and all signals arriving at that point will be irretrievably lost. This type of failure affects all the subscribers in the loop.

Such a failure can be overcome, at least as far as the rest of the system is concerned, by automatically bypassing the subset at which the failure occurs. A relay is used for this purpose, as shown in FIG. 4.

Figure 4:
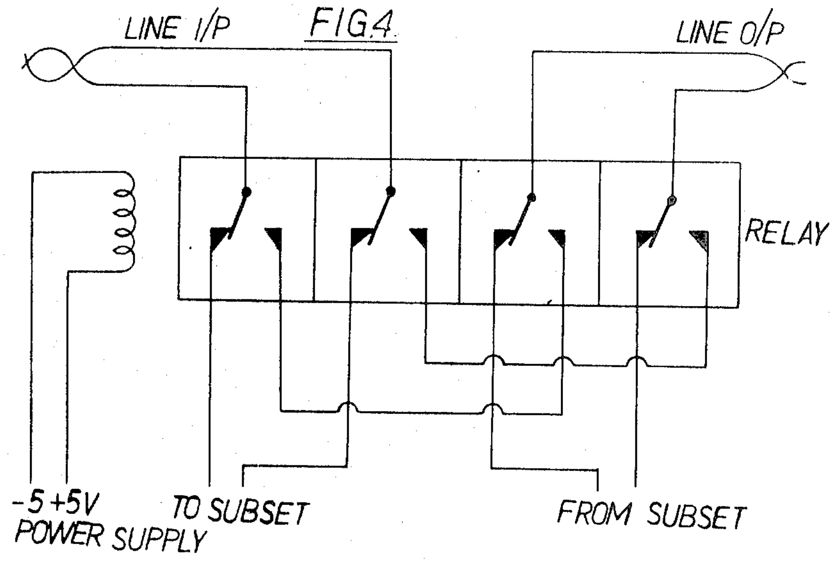
FIG. 4 illustrates the use of a relay to protect the system of FIG. 1 from power failure at a substation.

The relay in FIG. 4 is a four-pole changeover relay connected between the transmission line input and output and the subset in such a way that if the relay hold-in voltage fails the relay disconnects the line input and output from the subset and connects the line input directly to the line output, thus causing the line to bypass the subset. As shown in FIG. 4 the system uses a balanced transmission line, hence the need for a four-pole relay. If an unbalanced transmission line were used the relay would only be a 2-pole relay.

It is assumed that the subset power supply is between +5 v. and −5 v. bus bars, therefore the relay operating coil is effectively connected across a 10-volt supply. The relay operating characteristics are such that it should pull-in at just under 10 volts, say 9 volts, and should drop out at a slightly lower voltage which should be in excess of 5 volts, say 6 volts. Thus when the power supply is switched on the relay will not pull-in unless the power supply is at least near its nominal voltage. On the other hand the relay will not drop out if there is a mild fluctuation in the power supply insufficient to affect seriously the working of the subset.

It is to be understood that the foregoing description of specific examples of this invention is made by way of example only and is not to be considered as a limitation on its scope.

We claim:

1. Subscriber subsets for a PCM telephone system employing a line in the form of a continuous loop in which the loop passes through and is connected to each of a plurality of subscriber subsets, the subsets each comprising a shift register coupled to the loop to record the received signals, a station number detector coupled to the shift register for determining from signals in the shift register when a subscriber subset is being called, means for applying signals generated in a called subset for replacement of signals in the shift register, switching means for coupling signals from the shift register out to the loop and timing means associated with said switching means to receive the signals from the shift register and to retime the signals before they are applied to the loop.

2. A subset according to claim 1 including first and second signal storage means, means for transferring all the incoming line signals from the shift register in parallel to the first storage means, and means for transferring the signals generated in the subset from the second storage means for storage in the shift register.

3. A subset according to claim 1 including means for determining the presence in the incoming signals of certain signals of particular significance occurring when the subset is not locked onto any channel, and means for transferring all the signals available from the shift register to said means for determining the presence of such signals.

4. A subset according to claim 1 in which the timing means includes a flip-flop and the switching means applies all signals appearing at the output of the subset to the flip-flop, whether the signals originate in the subset or are existing incoming line signals, and means applying the output of the flip-flop to the outgoing line.

5. A subscriber subset for a PCM telephone system as claimed in claim 1 and including a relay inserted in the loop the contacts of which are set to bypass the subscriber subset when the relay power supply fails, the operating coil of the relay being connected across the power supply in the subset, the voltage necessary for holding the relay being within the voltage range required for normal operation of the subset.

6. A subset according to claim 5 wherein the relay is a four-pole changeover relay, the subset being connected thereby to a balanced transmission line.

7. A subset according to claim 5 in which the relay operating characteristics are such that the relay will pull-in when the power supply voltage exceeds 90 percent of its correct value and will drop out when the power supply voltage falls below 60 percent of its correct value.

* * * * *